United States Patent [19]

Morimoto et al.

[11] Patent Number: 4,908,839
[45] Date of Patent: Mar. 13, 1990

[54] CHANNEL SWITCHING SYSTEM

[75] Inventors: Hideaki Morimoto; Kiyoshi Funayama, both of Tokyo, Japan

[73] Assignee: NEC Corporation, Tokyo, Japan

[21] Appl. No.: 333,835

[22] Filed: Apr. 5, 1989

Related U.S. Application Data

[63] Continuation of Ser. No. 939,979, Dec. 10, 1986, abandoned.

[30] Foreign Application Priority Data

Dec. 11, 1985 [JP] Japan .................................. 60-279749
Dec. 11, 1985 [JP] Japan .................................. 60-279750

[51] Int. Cl.⁴ .......................... H04L 1/22; H04L 1/04
[52] U.S. Cl. ...................................... 375/40; 375/100; 375/102; 455/133
[58] Field of Search .................... 375/40, 38, 100, 102; 455/8, 52, 133, 135; 340/825.01; 371/8

[56] References Cited

U.S. PATENT DOCUMENTS 3,111,624  11/1963  Farkas .......................... 340/825.01
4,063,174  12/1977  Gupta et al. ...................... 455/52
4,395,772   7/1983  Trested, Jr. .................... 340/825.01

Primary Examiner—Douglas W. Olms
Assistant Examiner—Chris Edwards
Attorney, Agent, or Firm—Sughrue, Mion, Zinn, Macpeak & Seas

[57] ABSTRACT

In a digital radio communication system using at least two regular channel and two or more standby channels for transmitting a test signal therethrough in the standby condition thereby permitting the regular channel to be synchronously switched to one of the standby channels, the improvement wherein a channel switching system for monitoring the standby channels is provided at the receiving side of the digital communication system with: control signal generator means operating so that when two or more standby channels are in standby condition, it generates a control signal to designate them in turn, and when only one standby channel is in standby condition, it generates a control signal to designate the channel; synchronizing switching means for selectively outputting the test signal transmitted via each of the standby channels designated by the control signal; and standby channel monitoring means for detecting an output from the synchronizing switching means to monitor the communication quality of the standby channel placed in standby condition on the basis of the result detected.

5 Claims, 3 Drawing Sheets

CHANNEL SWITCHING SYSTEM

This is a continuation of application Ser. No. 939,979, filed Dec. 10, 1986, abandoned.

BACKGROUND OF THE INVENTION

The present invention relates to a channel switching system, and more particularly to a channel switching system used in a digital radio communication system having two or more standby channels.

There are many instances where radio communication systems are configured as regular/standby channel systems provided with one or more standby channels in order to relieve break or interruption of the regular channel which may be caused by fading.

Ordinarily, digital radio communication systems which have adopted the regular/standby channel system function not only to effect channel switching using coaxial switches but also to effect synchronizing switching [as disclosed in the Japanese patent publication No. 143850/80 (Tokkaisho No. 55-143850)] using a transmitting switching circuit comprising electronic circuits provided on the transmitting side and a synchronizing switching circuit provided on the receiving side, thus to prevent occurrence of code errors due to instantaneous interruption at the time of channel switching.

In the regular/standby system, a test signal is caused to be transmitted via the standby channel placed in standby condition to detect, on the receiving side, the test signal which has been transmitted, thereby to monitor communication quality of the standby channel.

In most cases, the conventional regular/standby channel systems used in the digital radio communication systems had employed N to 1 (N:1) system having one standby channel with respect to N regular channels. However, according as the requirement for channel reliability has increased, N:2 regular/standby systems have been recently proposed.

In the digital radio communication system having two or more standby channels, two cases are conceivable in connection with the number of standby channels placed in standby condition. First case is that two or more standby channels are in standby condition. Second case is that only one standby channel is in standby condition. In the prior art, there has not been a channel monitoring system which always monitors the communication quality of each standby channel placed in standby condition in accordance with the above two cases.

SUMMARY OF THE INVENTION

An object of the present invention is to provide a channel switching system which has eliminated the drawbacks encountered with the above-mentioned prior art.

To achieve this object, the present invention provides a channel switching system in a digital radio communication system using at least two regular channels and two or more standby channels for transmitting a test signal therethrough in the standby condition thereby permitting the regular channel to be synchronously switched to one of the standby channels comprising at the receiving side of the digital communication system: control signal generator means operating so that when two or more standby channels are in standby condition, it generates a control signal to designate them in turn, and when only one standby channel is in standby condition, it generates a control signal to designate the channel; synchronizing switching means for selectively outputting the test signal transmitted via each of the standby channels designated by the control signal; and standby channel monitoring means for detecting an output from the synchronizing switching means to monitor the communication quality of the standby channel placed in standby condition on the basis of the result detected.

DETAILED DESCRIPTION OF THE PREFERRED EMBODIMENTS

Preferred embodiments of a channel switching system according to the present invention applied to a digital radio communication system having two standby channels will be described in detail.

Figure 1:
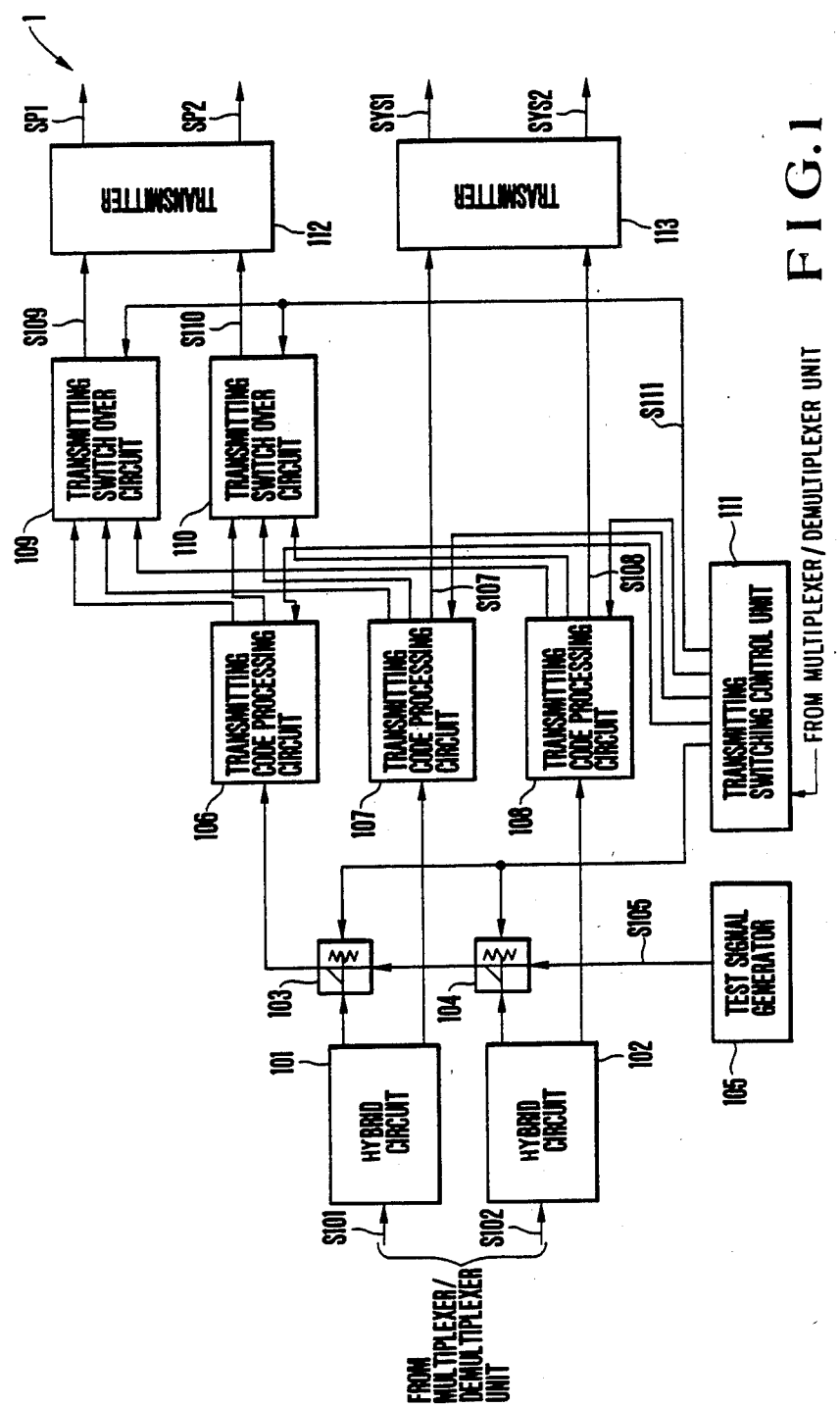
FIG. 1 is a block diagram illustrating a transmitting unit common to first and second embodiments according to the present invention.
Figure 2:
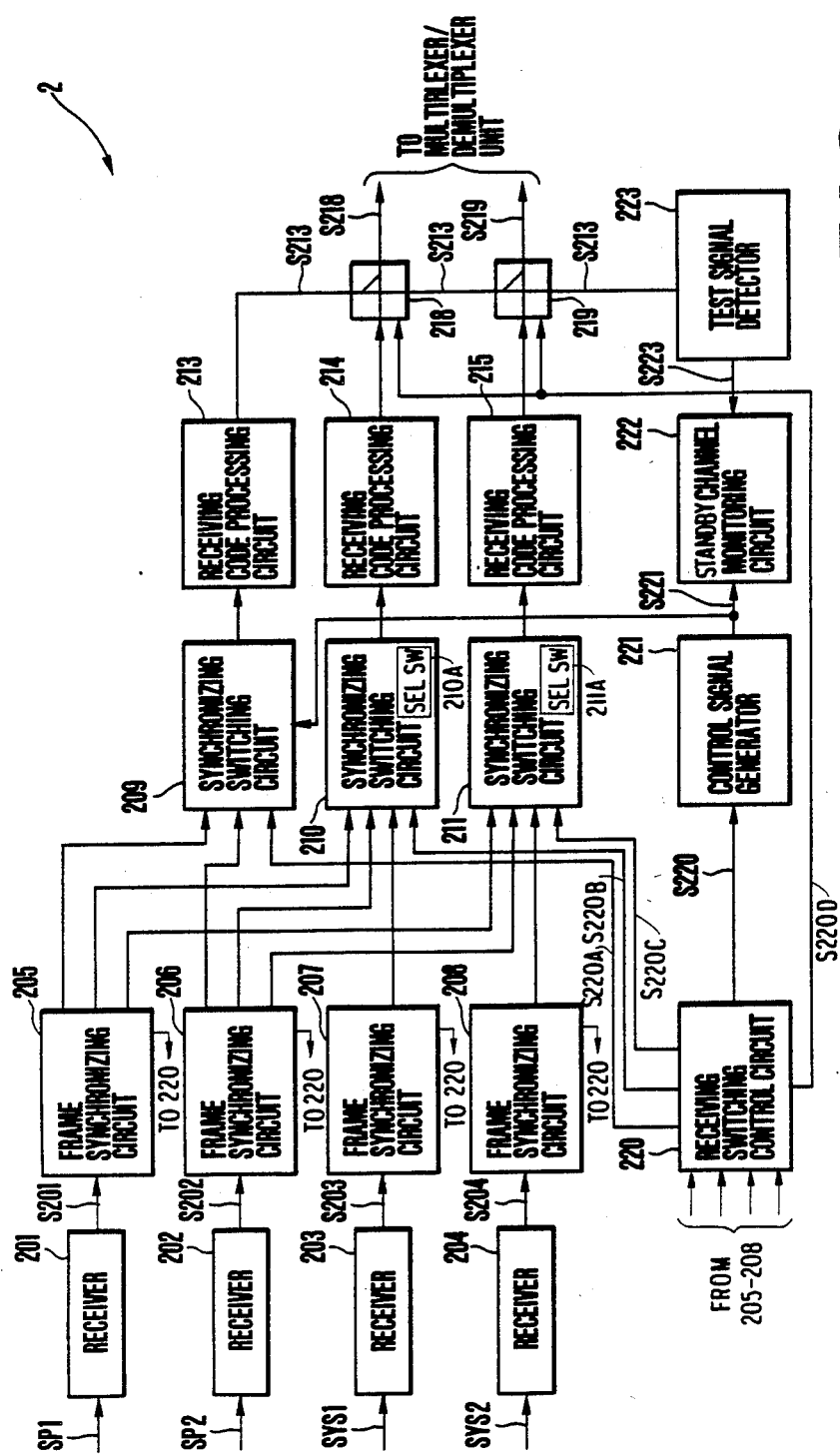
FIG. 2 is a block diagram illustrating a receiving unit in the first embodiment.

FIGS. 1 and 2 illustrate a transmitting unit 1 and a receiving unit 2 constituting a first embodiment of a channel switching system according to the present invention, respectively. The transmitting unit 1 shown in FIG. 1 comprises hybrid circuits 101 and 102 which respectively divide bipolar input signals S101 and S102 transmitted from a multiplex/demultiplexer unit (not shown) into two signals to output respective two signals thus divided therefrom, a test signal generator 105 which outputs a test signal S105 obtained as a specified bipolar pattern, coaxial switches 103 and 104 controlled by a transmitting switching control unit 111 to select either inputs from the hybrid circuits 101 and 102 or an input from the test signal generator 105 to output the selected one or ones. The transmitting unit 1 further comprises a transmitting code processing circuit 16 which converts an output signal from the coaxial switch 103 to a unipolar signal, applies speed conversion thereto, inserts additional bits, e.g., frame synchronization signal and parity check bits scrambles the additional bit inserted signal, and further divides the scrambled signal into two signals to output them therefrom, transmitting code processing circuits 107 and 108 which process the output signals from the hybrid circuits 101 and 102 to divide the processed signal into three signals and to output them therefrom, as in a manner similar to the processing in the transmitting code processing circuit 106, respectively, transmitting switching circuits 109 and 110 which input the output signals from the transmitting code processing circuits 106, 107 and 108 to select one of these three inputs on the basis of the control by a control signal S111 from the transmitting switching control unit 111 to output the selected ones as modulated input signals S109 and S110, respectively, a transmitter 112 which inputs the modulated signals S109 and S110 from the transmitting switching circuits 109 and 110, and a transmitter 113 which inputs the modulated signals S107 and S108 which are not supplied to the transmitting switching circuits 109 and 110. Output terminals of the transmitters 112 and 113 are connected to standby channels SP1 and SP2, and regular channels SYS1 and SYS2, respectively.

The receiving unit 2 shown in FIG. 2 comprises frame synchronizing circuits 205 and 206 which input demodulated signals S201 and S202 corresponding to output signals from receivers 201 and 202 provided on the standby channels SP1 and SP2 to carry out the frame synchronization and the parity check to detect degradation of code error rate, respectively, to divide these input signals into three signals to output them therefrom, respectively; and to inform a receiving switching control circuit 220 that the quality degradations of the corresponding standby channels are detected through respective lines, frame synchronizing circuits 207 and 208 which input demodulated signals S203 and S204 corresponding to outputs from receivers 203 and 204 provided on the regular channels SYS1 and SYS2 to regenerate the frame synchronization signal and detect the degradation of the code error rate in a manner similar to the processing in the frame synchronizing circuits 205 and 206, respectively, to directly output respective input signals therefrom; and to inform the receiving switching control circuit 220 that the quality degradations of the corresponding regular channels are detected through lines, the receiving switching control circuit 220 for detecting the degradations of the standby channels and the regular channels in accordance with the information sent from the frame synchronizing circuits 205, 206, 207 and 208 to output control signals S220, S220A, S220B, S220C and S220D a synchronizing switching circuit 209 which inputs the output signals from the frame synchronizing circuits 205 and 206 to select either of these two inputs on the basis of the control by a control signal S220A from the receiving switching control circuit 220 and control signal S221 from a control signal generator 221 and to output the selected one therefrom; a synchronizing switching circuit 210 which inputs the output signals from the frame synchronizing circuits 205, 206 and 207 to select one of three inputs on the basis of the control of a control signal S220B from the receiving switching control circuit 220 and to output the selected one therefrom; a synchronizing switching circuit 211 which inputs the output signals from the frame synchronizing circuits 205, 206 and 208 to select one of these three inputs on the basis of the control signal S220C from the receiving switching control circuit 220 and to output the selected one therefrom; receiving code processing circuits 213, 214 and 215 which descramble the output signals from the synchronizing switching circuits 209, 210 and 211 to eliminate the additional bits from the descrambled signals, apply speed conversion thereto, convert the speed converted signals into bipolar signals, and output them therefrom, respectively; a coaxial switch 218 controlled by the control signal S220D from the receiving switching control unit 220 to select either of the output signals from the receiving code processing circuits 213 and 214 to output the selected one as an output signal S218, and to transfer an output signal S213 from the receiving code processing circuit 213 to a coaxial switch 219 when the output signal of the receiving code processing circuit 213 is selected; the coaxial switch 219 controlled by the receiving switching control unit 220 to select either of output signals from the receiving code processing circuit 215 and the coaxial switch 218 and output the selected one as an output signal S219, and to output the signal S213 to a test signal detector 223 when the output signal from the receiving code processing circuit 215 is selected; the test signal detector 223 which inputs the signal S213 from the coaxial switch 219 to output a detection signal S223 therefrom; the control signal generator 221 which inputs the condition signal S220 from the receiving switching control unit 220 to output the control signal S221 mentioned above; and a standby channel monitoring circuit 222 which inputs the detection signal S223 and the control signal S221 to monitor the communication quality of the standby channels.

In FIG. 1, a receiving unit 2′ having same configuration as the receiving unit 2 is connected to the transmitting switching control unit 111 of the transmitting unit 1.

The transmitting unit 1′ and the receiving unit 2′ are connected with each other in the same manner as the connection between the transmitting unit 1 and the receiving unit 2.

The operation of the channel monitoring circuit according to the first embodiment shown in FIGS. 1 and 2 will be now described.

Initially, an explanation will be made in connection with the case where all channels are in normal condition.

In this case, the signals S101 and S102 are input to the transmitting code processing circuits 107 and 108 through the hybrid circuits 101 and 102, respectively. In the processing circuits 107 and 108, they are converted to the modulated signals S107 and S108 and are transmitted via the regular channels SYS1 and SYS2 from the transmitters 112 and 113, respectively. Thus demodulated signals S203 and S204 which are output from the receivers 203 and 204 provided on the regular channels SYS1 and SYS2 are delivered to the synchronizing switching circuits 210 and 211 through the frame synchronizing circuits 207 and 208, respectively. Then, signals selectively output from these circuits 210 and 211 in accordance with the control S220B and S220C, respectively, from the receiving switching control unit 220 are converted to the signals S218 and S219 at the receiving code processing circuits 214 and 215, respectively. The signals thus obtained are output to a multiplexer/demultiplexer (not shown) on the receiving side.

On the other hand, the test signal S105 from the test signal generator 105 (FIG. 1) is delivered to the transmitting code processing circuit 106 through the coaxial switches 104 and 103. At the transmitting code processing circuit 106, the test signal S105 is subjected to the signal conversion and then is input to the both transmitting switching circuits 109 and 110. Thus, the signals selected at the transmitting switching circuits 109 and 110 are output as the modulated signals S109 and S110 to the transmitter 112, respectively. They are transmitted via the standby channels SP1 and SP2 from the transmitter 112. The demodulated signals from the receivers 201 and 202 provided on the standby channels SP1 and SP2 are input to the synchronizing switching circuit 209 through the frame synchronizing circuits 205 and 206. The control signal generator 221 detects that both the standby channels SP1 and SP2 are in standby condition on the basis of the channel condition signal S220 from the receiving switching control unit 220 to control the synchronizing switching circuit 209 using the control signal S221, thus allowing the circuit 209 to effect synchronizing switching operation, thereby to output by turns the output signals from the frame synchronizing circuits 205 and 206 at a fixed time period. The output from the circuit 209 is converted to a signal S213 at the receiving code processing circuit 213. This signal S213 is output to the test signal detector 223 through the coaxial switches 218 and 219. The signal S213 corresponds to a signal obtained by switching by turns the test signal S105 transmitted via the standby channel SP1 and the test signal S105 transmitted via the standby channel SP2. When the test signal detector 223 detects the signal S213, it outputs the detection signal S223. The standby channel monitoring circuit 222 samples the detection signal S223 using the control signal S221 from the control signal generator 221 in synchronism with the switching operation at the synchronizing switching circuit 209, thereby to monitor by turns the communication quality of the standby channels SP1 and SP2.

Then, an explanation will be made in connection with the case where when code error rate of the actually used channel SYS1 degrades due to fading etc., the regular channel SYS1 is switched to the standby channel SP1 on the basis of the synchronizing switching operation.

When the receiving switching control circuit 220 has detected the above degradation, by the signal S207 from the frame synchronizing circuit 207 it outputs the control signal S220 serving as the command for switching the regular channel SYS1 to the standby channel SP1. The synchronizing switching circuit 210 is provided with a select switch 210A responsive to the control signal S220 to selectively output either of the output signals from the frame synchronizing circuits 205 and 206, and a synchronizing switch for synchronously switching the output signals from the frame synchronizing circuit 207 and the output signal from the select switch 210A. Likewise, the synchronizing switching circuit 211 is provided with a select switch 211A having the same function as stated above, and a synchronizing switch for synchronously switching the output signal from the frame synchronizing circuit 208 and the output signal from the select switch 211A. The switching command S220B controls the select switch 210A of the synchronizing switching circuit 210 thereby allowing it to selectively output the output signal from the frame synchronizing circuit 205. The switching command S220B is also sent to the transmitting switching control unit 111 of the transmitting unit 1. The element for accomplishing this is well known in the art and is not considered part of this invention, thus, it is not detailed here. Responding to this switching command, the transmitting switching control unit 111 through transmitting unit 1' and the receiving unit 2 controls the transmitting switching circuit 109, thereby allowing it to selectively output the output signal from the transmitting code processing circuit 107. As a result, the output signal from the transmitting code processing circuit 107 is parallely transmitted via the regular channel SYS1 and the standby channel SP1. In this instance, there is the possibility that the synchronization of the frame synchronizing circuit 205 is transiently disturbed due to the switching operation of the transmitting switching circuit 109. Accordingly, after it is confirmed that the synchronization has been recovered and the code error rate has become normal, the receiving switching control circuit 220 controls the select switch 210A provided in the synchronizing switching circuit 210, allowing it to effect synchronizing switching operation. By this switching operation, the input of the receiving code processing circuit 214 is switched from the output of the frame synchronizing circuit 207 which has been input until now to the output of the frame synchronizing circuit 205, i.e., the signal which has been transferred via the standby channel SP1. Thus, the channel switching is completed.

In this case, the test signal S105 is transmitted via only the standby channel SP2. The control signal generator 221 detects by the channel condition signal S220 that the command for switching the regular channel SYS1 to the standby channel SP1 has been issued, and then delivers the control signal S221 to the synchronizing switching circuit 209 to control it, thereby causing it to output only the output signal from the frame synchronizing circuit 206. As a result, only the test signal S105 which has been transmitted via the standby channels SP2 is obtained as the output signal from the receiving code processing circuit 213. The standby channel monitoring circuit 222 detects by the control signal S221 from the control signal generator 221 that only the standby channel SP2 is in standby condition to monitor the communication quality of the standby channel SP2 on the basis of the detection signal S223 from the test signal detector 223.

The operation in the case where the regular channel SYS1 is synchronously switched to the standby channel SP2 or the operation in the case where the regular channel SYS2 is synchronously switched to the standby channel SP1 or SP2 is the same as the operation in the above-mentioned case. The standby channel monitoring circuit 222 monitors the communication quality of the standby channel placed in standby condition.

With respect to faults occuring, e.g., in the transmitting code processing circuits 106, 107 and 108 and the receiving code processing circuits 213, 214 and 215, which cannot be relieved by the channel switching based on the synchronizing switching having been previously described, the channel switching is performed by the coaxial switches 103 and 104, and 218 and 219. For instance, in the case of switching the regular channel SYS1 to the standby channel SP1 by such a channel switching, the coaxial switch 103 outputs the output signal from the hybrid circuit 101 to the transmitting code processing circuit 106. Thus the transmitting switching circuit 109 selectively outputs the output signal from the transmitting code processing circuit 106. As a result, the signal which has been transmitted via the regular channel SYS1 is transmitted via the standby channel SP1 as well. The control signal generator 221 detects this channel switching by the channel condition signal S220 thereby controlling the synchronizing switching circuit 209 by the control signal S221 to selectively output the output signal from the frame synchronizing circuit 205. The coaxial switch 218 outputs the output signal from the receiving code processing circuit 213 as the output signal S213. In this instance, the standby channel SP2 can be used in the synchronizing switching to the regular channel SYS2.

The embodiment of the present invention has been described in connection with the case where both the number of regular channels and that of the standby channels are equal to 2. However, it is needless to say that the present invention is applicable to the cases where the number of standby channels is equal to 3 or more. In addition, the present invention is applicable to all the cases where the number of the regular channels is equal to 1 or more.

A second embodiment according to the present invention will be now described. In accordance with the second embodiment, there is provided a channel monitoring system based on the delay compensation system to compensate for respective fixed delay differences between regular channels and standby channels. Since the configuration of the transmitting unit is the same as that in the first embodiment, explanation in regard thereto will be made with reference to FIG. 1.

Figure 3:
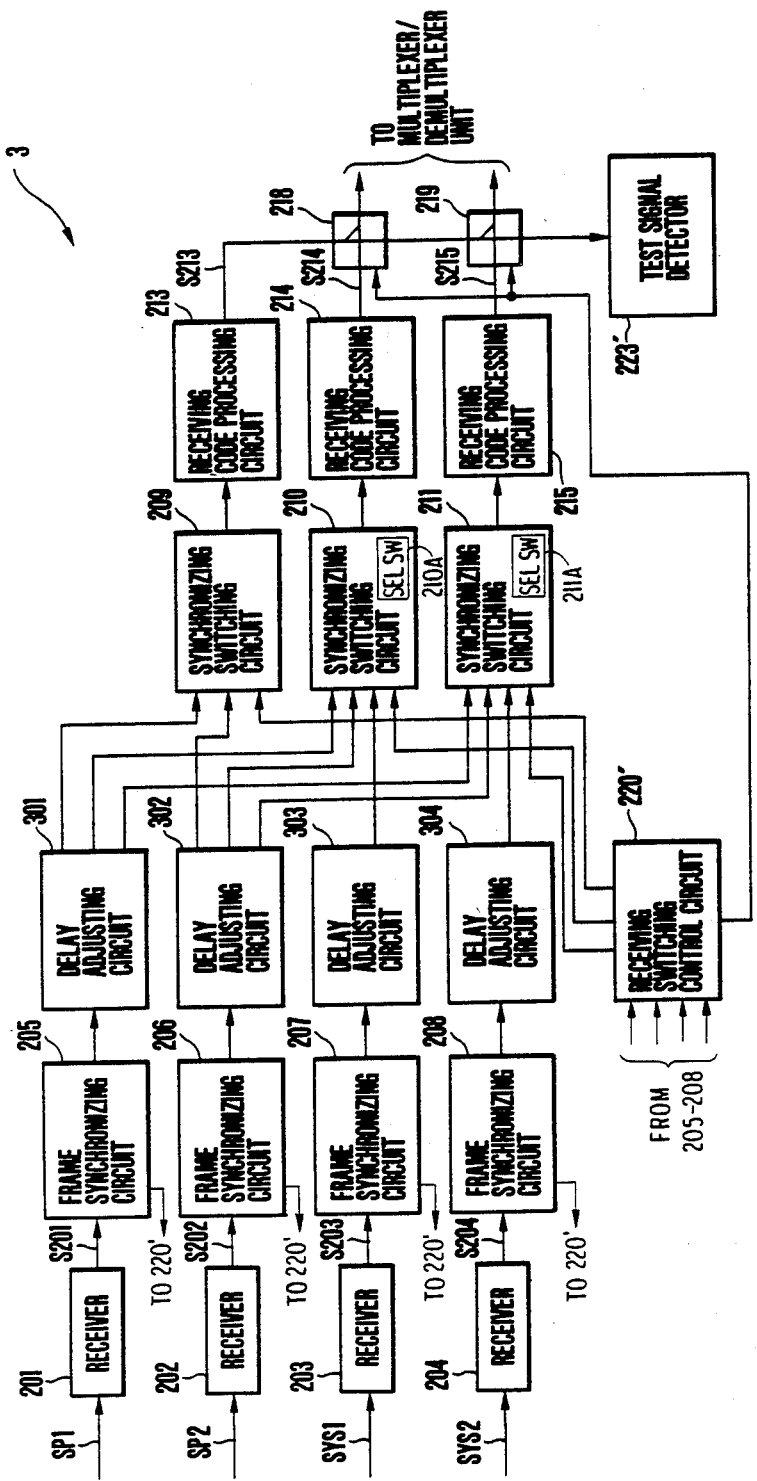
FIG. 3 is a block diagram illustrating a receiving unit in the second embodiment.

FIG. 3 is a block diagram illustrating a receiving unit 3 employed in this embodiment. In FIG. 3, circuit components represented by the same reference numerals as those in FIG. 2 denote the same ones as in the first embodiment.

Output terminals of the frame synchronizing circuits 205 and 206 are connected to delay adjusting circuits 301 and 302, respectively, which are capable of adjusting delay times. The delay adjusting circuits 301 and 302 function to delay the output signals from the frame synchronizing circuits 205 and 206 and divide the signals thus delayed into three signals to output them, respectively. Likewise, output terminals of the frame synchronizing circuits 207 and 208 are connected to delay adjusting circuits 303 and 304 which are capable of adjusting delay times and function to delay output signals from the frame synchronizing circuits 207 and 208 to output delayed signals, respectively. First output terminals of the delay adjusting circuits 301 and 302 are connected to the synchronizing switching circuit 209 which selectively output either of output signals therefrom under control of the receiving switching control unit 220. Second output terminals of the delay adjusting circuits 301 and 302 and the output terminal of the delay adjusting circuit 303 are connected to the synchronizing switching circuit 210. Third output terminals of the delay adjusting circuits 301 and 302 are both connected to the synchronizing switching circuit 211. In addition, the output terminals of the synchronizing switching circuits 209, 210 and 211 are connected to the receiving code processing circuits 213, 214 and 215, respectively. The connection between the receiving code processing circuits 213, 214 and 215 and the coaxial switches 218 and 219, and the connection between the coaxial switch 219 and the test signal detector 223 are the same as those in FIG. 2.

The operation of the second embodiment according to the present invention will be now described with reference to FIGS. 1 and 3.

(1) The case where both the regular channels SYS1 and SYS2 are in normal condition.

In this case, the test signal S105 is input to the transmitting code processing circuit 106 through the coaxial switches 104 and 103, at which it is subjected to signal conversion. The signals thus obtained are input to the both transmitting switching circuits 109 and 110, at which they are subjected to selective operation and then are parallely transmitted as modulated signals S109 and S110, respectively. They are input to the synchronizing switching circuit 209 so that one passes through the frame synchronizing circuit 205 and the delay adjusting circuit 301, and the other passes through the frame synchronizing circuit 206 and the delay adjusting circuit 302. The delay times of the delay adjusting circuits 301 and 302 are adjusted in advance so that the fixed delay difference between these two inputs to the synchronizing switching circuit 209 is equal to zero. The synchronizing switching circuit 209 automatically compensates for the variable delay difference between the two inputs to effect synchronizing switching of the two inputs at a fixed time period under the control of the receiving switching control unit 220' substantially including the control unit 220 and the control signal generator 221 shown in FIG. 2 to output them by turns. Each output signal obtained by the synchronizing switching operation is converted to the signal S213 at the receiving code processing circuit 213. Accordingly, the signal S213 corresponds to a signal obtained by switching by turns the test signal S105 which has been transmitted via the standby channel SP1 and the test signal S105 which has been transmitted via the standby channel SP2. The test signal detector 223' with monitoring function detects the signal S213, thereby to monitor the communication quality of the standby channels SP1 and SP2.

On the other hand, input signal S101 and S102 to the transmitting unit 1 are input to the transmitting code processing circuits 107 and 108 through the hybrid circuits 101 and 102, respectively, at which they are converted to modulated signals S107 and S108 and are transmitted via the regular channels SYS1 and SYS2. The demodulated signals S203 and S204 transmitted via the regular channels SYS1 and SYS2 are input to the synchronizing switching circuits 210 and 211 through the frame synchronizing circuit 207 and the delay adjusting circuit 303, and the frame synchronizing circuit 208 and the delay adjusting circuit 304, respectively. They are selectively output therefrom and then are converted to output signals S214 and S215 at the receiving code processing circuits 214 and 215, respectively. Thus, these output signals S214 and S215 are output to the multiplexer/demultiplexer on the receiving side through the coaxial switches 218 and 219, respectively.

(2) The case where the regular channel SYS1 is switched to the standby channel SP1 by the synchronizing switching.

When the frame synchronizing circuit 207 on a receiving side detects that the code error rate of the regular channel SYS1 due to the fading has degraded, the receiving switching control circuit 220 detects this fact to output a command for switching the regular channel SYS1 to the standby channel SP1. This switching command is sent to the transmitting switching control circuit 111 on a transmitting side through a transmitter 1 (not shown in FIG. 2) on the receiving side and a receiver 2 (not shown in FIG. 1) on the transmitting side Thus, the transmitting switching circuit 109 selectively outputs the output signal from the transmitting code processing circuit 107 under control of the transmitting switching control circuit. As a result, the output signal from the transmitting code processing circuit 107 is parallely transmitted via the regular channel SYS1 and the standby channel SP1. The above-mentioned switching command also controls the select switch provided in the synchronizing switching circuit 210, causing it to selectively output the output signal from the delay adjusting circuit 301. As a result, the output signal from the synchronizing switching circuit 210, i.e., the signal transmitted via the regular channel SYS1 and the output signal from the delay adjusting circuit 301, i.e., the signal transmitted via the standby channel SP1 are input to the synchronizing switch provided in the synchronizing switching circuit 210. The delay time of the delay adjusting circuit 303 is adjusted so that the fixed delay difference between these two inputs is equal to zero. In this instance, there is the possibility that the synchronization of the frame synchronizing circuit 205 is transiently disturbed due to the switching operation of the transmitting switching circuit 109. Accordingly, after it is confirmed that the synchronization has been recovered and the code error rate has become normal, the receiving switching control unit 220' controls the synchronizing switch provided in the synchronizing switching circuit 210, thus causing it to effect synchronizing switching. At the time of the switching, the synchronizing switch automatically compensates for the variable delay difference between two inputs. By this switching, the input to the receiving code processing circuit 214 is switched from the signal having been transmitted via the regular channel SYS1 which has been input until now to the signal which has been transmitted via the standby channel SP1. Thus, the channel switching is completed.

In this instance, the test signal S105 is transmitted via only the standby channel SP2. The receiving switching control circuit 220 controls the synchronizing switching circuit 209 to selectively output only the output signal from the delay adjusting circuit 302. As a result, only the test signal S105 which has been transmitted via the standby channel SP2 is obtained as the output signal S213 of the receiving code processing circuit 213. Thus the test signal detector 223 monitors the communication quality of the standby channel SP2.

The delay time of the delay adjusting circuit 304 is adjusted in advance in the same manner as the adjustment in the delay adjusting circuit 303.

By the adjustment of the delay adjusting circuits 301 to 304 which has been described, mutual fixed delay differences between all channels become equal to zero. Accordingly, it is possible to synchronously switch the regular channel SYS1 to the standby channel SP2 or the regular channel SYS2 to the standby channel SP1 or SP2 in the same manner as the case of synchronously switching the regular channel SYS1 to the standby channel SP1.

Since it is possible to compensate for the fixed delay difference between the standby channels SP1 and SP2 by using only either of the delay adjusting circuits 301 and 302, the provision of either of the delay adjusting circuits 301 and 302 may be omitted. In the case where either thereof is omitted, it is necessary to change the frame synchronizing circuit corresponding to the delay adjusting circuit omitted so that it functions to divide its input signal into three input signals and output them.

The above-mentioned delay compensation system is adapted to compensate for fixed delay differences between respective mutual channels using the delay adjusting circuit provided on the standby channel. Thus, by providing one delay adjusting circuit per each regular channel, it is possible to compensate for fixed delay differences between respective regular channels and standby channels. Accordingly, when the number of standby channels is represented by M (which is an integer equal to 2 or more) and the number of regular channels is represented by N (which is an integer equal to 1 or more), the minimum number of the delay adjusting circuits necessary when used in the present invention is represented by $(M-1+N)$. In the case where no delay adjusting circuit is provided on the standby channel and the compensation of fixed delay differences between respective mutual standby channels is not required, M delay adjusting circuits are required per each regular channel in order to compensate for fixed delay differences between respective regular channels and standby channels. In this case, the required total number MN of the delay adjusting circuits is larger than that when the present invention is used because $MN-(M-1+N)=(M-1)(N-1) \geq 0$. For the reason stated above, it is apparent that delay adjusting circuits equal to $(M-1+N)$ or more are required in order to compensate for fixed delay differences between respective regular channels and standby channels.

What is claimed is:

1. A channel switching system in a digital radio communication system using at least two regular channel and two or more standby channels for transmitting a test signal therethrough in the standby condition, thereby permitting at least one of said regular channels to be synchronously switched to one of said standby channels, said channel switching system comprising at the receiving side of said digital communication system:
control signal generator means operating so that when two or more standby channels are in standby condition it generates a control signal to designate them in turn, and when only one standby channel is in standby condition, it generates a control signal to designate the channel.
synchronizing switching means for selectively outputting said test signal transmitted via each of said standby channels designated by said control signal, and
standby channel monitoring means for detecting an output from said synchronizing switching means to monitor the communication quality of the standby channel placed in standby condition on the basis of a result detected.

2. A channel switching system as set forth in claim 1, which further comprises delay adjusting means for compensating a fixed delay difference between said standby channels.

3. A channel switching system as set forth in claim 1, which further comprises a frame synchronizing means provided on each of said regular channel and said standby channels at the input portion of said receiving side of said digital communication system.

4. A channel switching system as set forth in claim 2, said delay adjusting means is provided between said synchronizing switching means and said frame synchronizing means.

5. A channel switching system according to claim 4 wherein said synchronizing switching means comprising a plurality of synchronizing switching circuits which receive outputs of all said frame synchronizing means provided on said standby channels and perform synchronizing switching of said received outputs of all said frame synchronizing means in accordance with said control signal designating the channels to output said test signal through respective standby channels in time series, respectively.

* * * * *